United States Patent [19]

Gilbert

[11] 4,228,924
[45] Oct. 21, 1980

[54] MIXTURE METERING MACHINE

[76] Inventor: Charles H. Gilbert, 2101 Camino Rey, Fullerton, Calif. 92633

[21] Appl. No.: 936,312

[22] Filed: Aug. 23, 1978

[51] Int. Cl.³ .............................................. B67D 5/08
[52] U.S. Cl. .................................... 222/63; 222/137; 222/263; 222/334; 222/309; 137/99; 222/145
[58] Field of Search ................. 137/99, 99.5; 141/105, 141/107; 366/152, 160–162; 222/47, 61, 63, 135, 136, 137, 255, 263, 267, 276, 282, 305, 309, 334, 335, 41, 43, 44

[56] References Cited

U.S. PATENT DOCUMENTS

| | | | |
|---|---|---|---|
| 2,885,119 | 5/1959 | Cartiol | 222/135 |
| 2,946,488 | 7/1960 | Kraft | 222/309 |
| 3,341,076 | 9/1967 | Wasilewski et al. | 222/334 |
| 3,776,252 | 12/1973 | Wilcox | 137/99 |
| 3,814,289 | 6/1974 | Robbins | 222/135 |
| 3,926,345 | 12/1975 | Pulk et al. | 222/309 |

*Primary Examiner*—H. Grant Skaggs
*Attorney, Agent, or Firm*—Nilsson, Robbins, Dalgarn, Berliner, Carson & Wurst

[57] ABSTRACT

A machine is disclosed for repeatedly metering out quantities of a predetermined volume of fluid freshly mixed from a plurality of component sources. A mixing member (which may comprise simply a duct) is coupled to receive a plurality of component fluids through positive control valves. Reciprocating metering structures (cylinder-piston), connected to the valves, are driven in a controlled fashion by pressurized fluid and a reciprocating actuator. The control system incorporates sensors for detecting the positions of the metering structures as well as the valves to provide timely signals which change the valve positions and reverse the stroke. With the valves in one position, and upon movement of the actuator in one direction, fluid flows under pressure from a component source to an associated metering structure, then with the valves in another position, the actuator is reversed and the fluid is discharged from the metering structure to the mixing chamber. The valves are synchronously controlled by gear wheels which mesh with a common driver. As implemented, the control is by a pneumatic system.

5 Claims, 2 Drawing Figures

MIXTURE METERING MACHINE

BACKGROUND AND SUMMARY OF THE INVENTION

A number of applications exist for equipment that is capable of delivering predetermined quantities of fluid, as in the form of a liquid or semiliquid, which consists of a precise, fresh mixture of several components. Considering applications, a variety of resins and other synthetic materials, as silicon rubber, are formulated from a plurality of components. For example, a variety of synthetic materials involve a precise combination of two distinct components which, once combined, will react and solidify to a desired physical form. As a specific example, polymers are widely used in combination with catalysts which together cure, achieving vulcanization and providing a rubber-like solid substance. For some materials, the ratio of the individual components is highly critical; however, for almost all of such materials, precise volume measurements in the mixture are desirable in attaining the product.

Over the years a vast number of meter-mix structures have been proposed for handling fluids in the form of liquid or semiliquid materials. However, a need is deemed to continue to exist for an effective meter-mix machine to deliver a multicomponent material and that is capable of delivering metered quantities of material consisting of a precise, fresh mixture. In various applications, metered quantities of material can serve to fill mold cavities or otherwise be provided to a variety of forming apparatus.

One class of meter-mix equipment as employed in the past has utilized check valves to control the flow of liquid components which subsequently are combined in the mixture. Specifically, for example, two liquid components may be drawn through check valves (which are connected to sources of the fluid) so as to load pumps that are discharged through another pair of check valves into a mixing chamber. Although these arrangements are effective for a variety of mixtures; certain difficulties arise in using such apparatus where precise mixtures are desired. Specifically, one of the problems of such apparatus arises because the check valves may not operate in complete synchronism. That is, pressure or mechanical differences may cause the check valves associated with the control of one liquid component to operate at instants of time that are somewhat offset from the operating times of the check valves controlling the other liquid. As a consequence, the component ratio tends to vary with each discharge and furthermore, the volume of each discharge varies. Consequently, a need exists for an effective, economical, durable and reliable meter-mix machine that will deliver precise discharges of fresh mixtures in consistent volumes.

In general, the present invention comprises a meter-mix machine utilizing positively acting valves which are synchronously operated to accomplish precise control. The positive valves are actuated by individual gear wheels that are rotated by a common drive. The control system of the machine senses the position of the valves as well as the position of a metering apparatus which includes a pump-like metering structure for each fluid component. The sensed data, in the form of control signals, is employed to control the valves and the stroke reversals of the metering structures.

BRIEF DESCRIPTION OF THE DRAWINGS

In the drawings, which constitute a part of this specification, an exemplary embodiment demonstrating the various objectives and features hereof is set forth as follows.

DESCRIPTION OF ILLUSTRATIVE EMBODIMENT

As indicated above, a detailed illustrative embodiment of the invention is disclosed herein. However, embodiments may be constructed in accordance with various forms, some of which may be rather different from the disclosed embodiment herein. Consequently, the specific structural and functional details disclosed herein are merely representative, yet in that regard they are deemed to provide the best embodiments for purposes of disclosure and to provide a basis for the claims herein which define the scope of the present invention.

Figure 1:
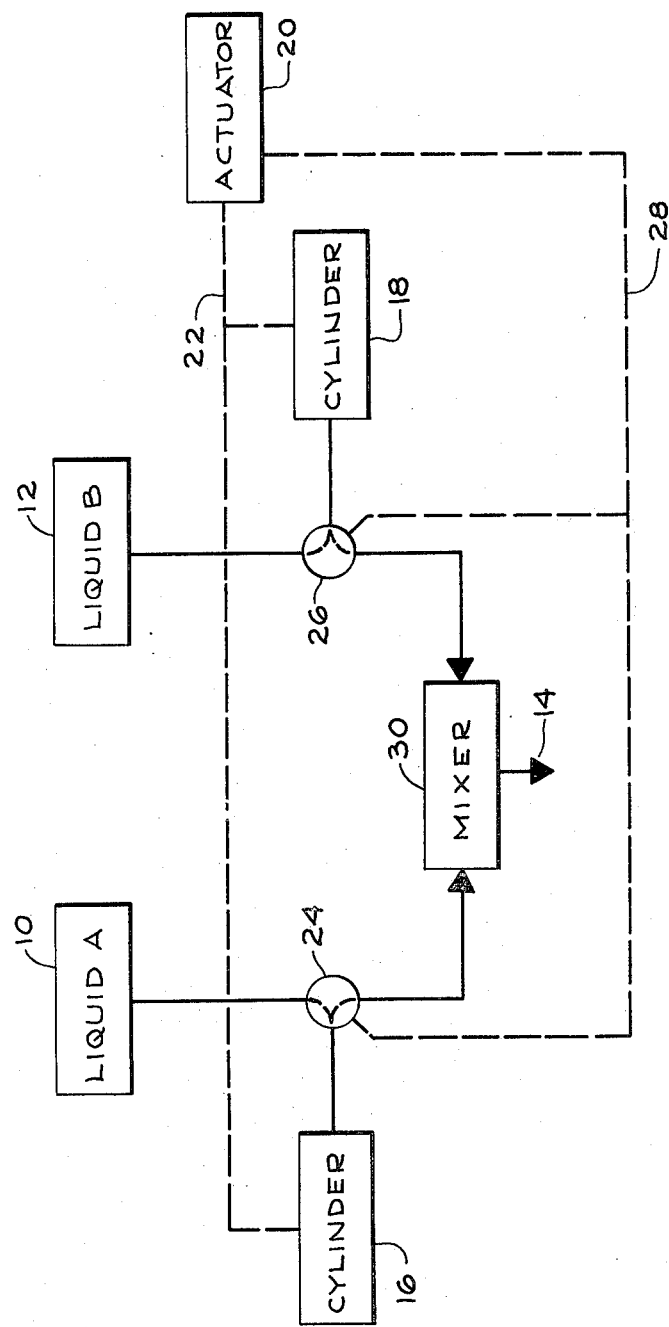
FIG. 1 is a preliminary diagrammatic view of a system in accordance with the present invention.

Referring initially to FIG. 1, a meter-mix machine is depicted for providing metered discharges of a fresh mixture consisting of predetermined volumetric ratios of liquid from two pressurized supply sources 10 and 12. As illustrated in detail below, various numbers of fluid components can be combined by embodiments of the system. Specifically, with reference to FIG. 1, the source 10 supplies a pressurized liquid A while the source 12 supplies a pressurized liquid B. Functionally, the machine combines the liquids in a predetermined volumetric relationship and provides metered discharges of a fresh mixture from a nozzle 14. As indicated above, the need for such apparatus arises in conjunction with a wide variety of substances including various synthetic and natural materials. A prime example involves the mixture of a polymer with a catalyst.

In the system as depicted in FIG. 1, movement of the liquids A and B is accomplished by pump-like reciprocating meterng cylinders 16 and 18 which are driven by an actuator 20 through a mechanical connection 22 as symbolically indicated. The actuator 20 also controls a pair of positive valves 24 and 26 acting through a coupling 28 as symbolically represented. Flow through the valves 24 and 26 is to a mixer 30 (static or dynamic as well known) from which the composite liquid is supplied to the discharge nozzle 14.

In the operation of the meter-mix machine as depicted in FIG. 1, during simultaneous loading strokes, components of the liquids A and B are forced under pressure through the valves 24 and 26 from the pair of pressurized supply sources 10 and 12, respectively to load the metering cylinders 16 and 18 respectively. During such operation, the valves 24 and 26 define a positive connection from the pressurized sources 10 and 12. Thereafter, during discharge strokes, with the valves actuated, the liquids from the metering cylinders 16 and 18 are discharged through the valves 24 and 26 respectively to the mixer 30 providing a metered discharge from the nozzle 14. The operation of the valves 24 and 26 is positive in that valves are actuated externally to define open or closed passages. That is, operation of the valves 24 and 26 is positive rather than dependent upon the operation of springs or pressures to set their states.

The positive control of the valves 24 and 26 is synchronously provided by the actuator 20, as is the operation of the metering cylinders 16 and 18. As a consequence, precise ratios of the liquids A and B are provided in the fresh mixture comprising each discharge from the nozzle 14 which is of a consistent volume. As will be disclosed in detail below, the system in accordance herewith provides precise control of the metering cylinders along with the valves and additionally enables variation in stroke length so as to alter the volume of each discharge from the nozzle during a particular mixing operation.

Figure 2:
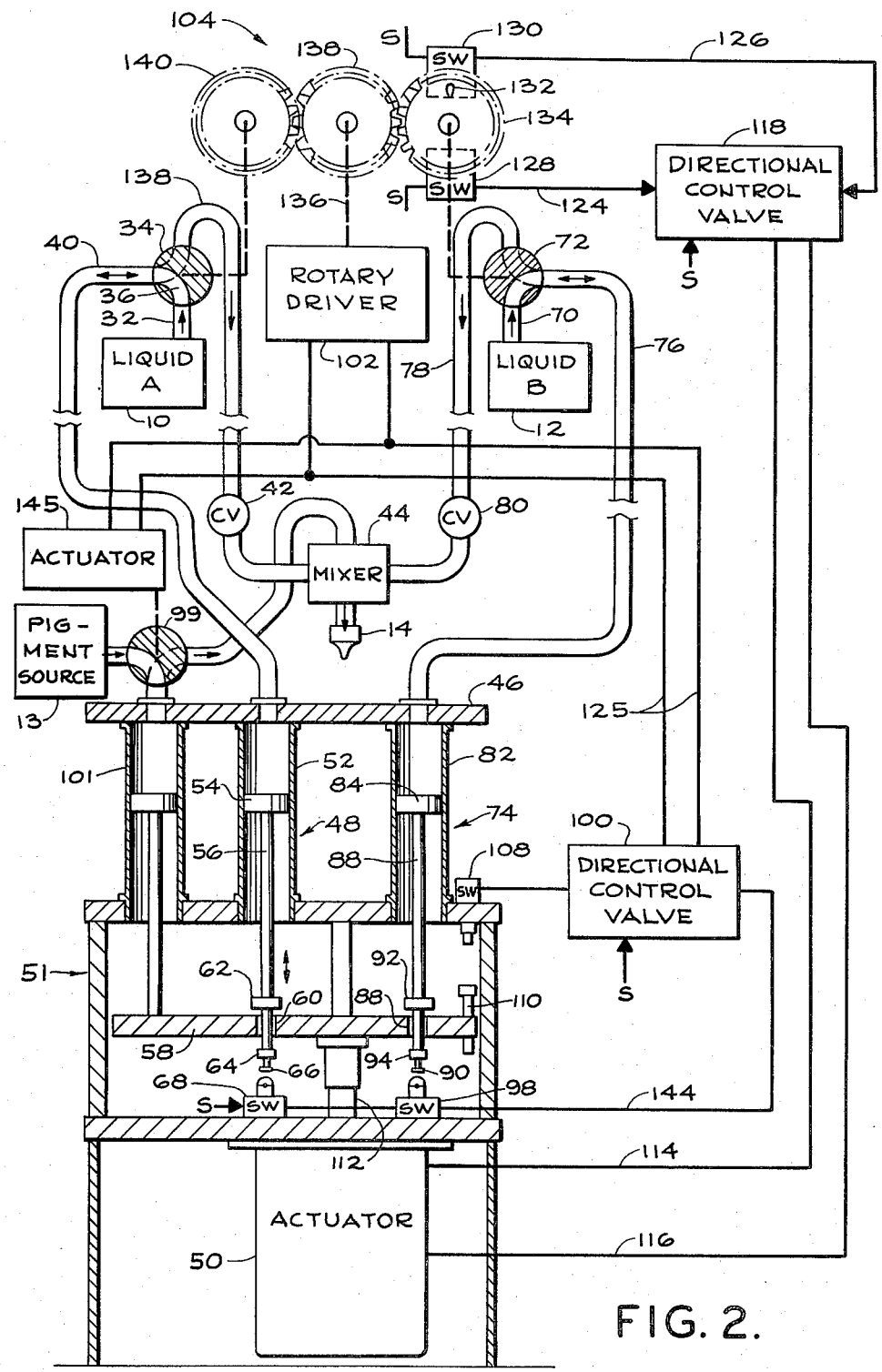
FIG. 2 is a schematic diagram showing the system of FIG. 1 in substantial detail.

Considering the system in somewhat greater detail, reference will now be made to FIG. 2, showing the pressurized sources 10 and 12 for supplying the liquids A and B. Also pigment or the like is provided as a third, less critical liquid from a pressurized source 13. With respect to such liquids, it is perhaps noteworthy that the applications realized for the machine of the present invention have generally involved the metering and mixing of liquids or semiliquid substances. However, the system is contemplated for any applications which might involve a fluid or flowable substance in substantially any form.

The sources 10 and 12 along with the source 13 (FIG. 2) may comprise simply elevated containers or tanks for the liquids with pumps or various other pressurized sources. A nozzle 14 (FIG. 2 center) is represented, recognizing that the function of the machine is to provide the metered discharges from the nozzle 14 which comprise a fresh mixture of the liquids A and B along with pigment in a predetermined ratio.

The structures for supplying the liquids A and B along with the pigment (fromthe sources 10 and 12 along with the source 13) to the nozzle 14 are generally similar. As will be apparent from the explanation below, embodiments of the present invention could be constructed to accommodate the mixture of various numbers of component liquids (or fluids).

As another preliminary matter, for clarification, the system or machine of FIG. 2 has been illustrated with the components well separated. In general, actual embodiments of the machine will likely utilize closely coupled components to minimize the length of ducts as a matter of good engineering practice. However, as indicated, the operating principles are deemed to be more readily apparent in FIG. 2 with the components well separated and spaced apart.

Initially considering the path of the liquid A, the source 10 is connected through a duct 32 to a three-way ball valve 34, the ball of which turns about a horizontal axis as depicted, so that the vertical passage 36 is aligned either with the duct 32 or a duct 138. The passage 36 angles within the ball of the valve 34 for continual alignment with a duct 40 coincident with the axis of rotation. The duct 138 is connected through a check valve 42 to a mixer 44 which supplies the liquid to the nozzle 14. The duct 40 (from the valve 34) is connected at the head 46 of a reciprocating metering cylinder structure 48 which is driven by a reciprocating actuator 50 (FIG. 2 bottom). The structure 48 and associated drive structure is generally fixed on a housing 51. The structure 48 includes a cylinder 52 containing a piston 54 coupled to an elongate connecting rod 56 which extends inside the housing 51 to be coupled (with some lost motion) to a drive plate 58. Specifically, the rod 56 extends through a bushing 60 in the drive plate 58 permitting the rod to slip with respect to the drive plate 58 between a pair of stops 62 and 64 that are carried on the rod 56. The lower end of the rod 56 terminates at a foot 66 for actuating an air switch 68. Essentially, the air switch 68 comprises a valve which is opened when the foot 66 is in a contacting or actuating position. In operation, actuation occurs when the fluid from the source 10 pushes the piston 54 down to contact the switch 68 with the foot 66. Note that the drive plate 58 stops at the end of its stroke, however, the rod 56 (and piston 54) continue a downward motion independently until the switch is activated. In that fashion, the system assures that each of the pistons, e.g. piston 52, is completely full before the reverse (or discharge stroke) is initiated. Positive load function is thus accomplished. The switch 68 is connected to a source of air under pressure, designated by the letter S, as adopted herein.

The structure 74 associated with the liquid B from the source 12 is similar to that described above for accommodating the liquid A. Specifically, the source 12 supplies liquid through a duct 70 to a three-way ball valve 72 which accommodates the loading of the reciprocating metering structure 74 (similar to the structure 48) through a duct 76. Discharge from the structure 74 is through the duct 76, the valve 72, and a duct 78 containing a check valve 80, for supplying the mixing chamber 44.

The structure 74 (liquid B) includes a cylinder 82 which contains a piston 84 carrying a connecting rod 86 which passes through a bushing 88 in the plate 58 and terminates in a switch-activating foot 90. Stops 92 and 94 are provided on the connecting rod 86 as previously described with respect to the connecting rod 56.

The third liquid or pigment is less critical and is supplied to the mixer 44 from the source 13 through a valve 99 and a metering structure 100 that is similar to the parallel units described above. The reciprocating metering structure 48, 74, and 101 are actuated in unison by the control system. Specifically, the foot 90 at the base of the structure 74 actuates an air switch 98 which is serially connected with the air switch 68 between a source of air (symbolically represented by the letter S) and a directional drive control valve 100.

In one form of the present apparatus, the control valve 100 may comprise a two-position spool valve to control a rotary motor or driver 102 which alternately turns one half revolution. The driver 102 positions the valves 34 and 72 through a mechanical linkage 104 (described below).

The control valve 100 is actuated to either one of two states by the air switches 68 and 98 co-acting or the operation of an air switch 108 which is actuated by a push rod 110 that is adjustably fixed in the plate 58. That is, when the rod 112 is at the top of its stroke, the air switch 108 sets the valve 100 in one state to actuate the driver 102 through one half revolution. Then, when the rod 112 is at the bottom of its stroke, the pistons 54 and 84 continue to move down to assure that the reciprocating metering structures 48 and 74 are full. Then the switches 68 and 98 are activated cooperatively to set the valve 100 in the opposed state and actuate the driver 102 through an alternate half revolution.

The reciprocating driver plate 58, carried on a rod 112, provides the drive from the reciprocating actuator 50. Functionally, the actuator 50 is controlled by a pair of pneumatic signals that are passed through lines 114 and 116. A pneumatic signal alternatively appears in each line and determines the direction of the stroke by the rod 112. The lines 114 and 116 are supplied by a directional control valve 118 which may take a form similar to that of the valve 100. The valve 118 is set in one of two states by air or pneumatic signals provided through lines 124 and 126 from the mechanism 104. Specifically, the control valve 118 is operated by pneumatic signals provided through lines 124 and 126 connected respectively to air switches 128 and 130 that are activated by a cam lobe 132 on a gear wheel 134 which is part of the mechanism 104. Somewhat more specifically, the half-revolution driver 102 is coupled (as indicated by a dashed line 136) to a drive wheel 138 which meshes with the opposed gear wheels 134 and 140. The gear wheels 140 and 134 are connected respectively to actuate the ball valves 34 and 72. Thus, the actuator 50 and the mechanism 104 are synchronously operated by the control valves 100 and 118 to effectively control the metering structures 54 and 74, along with the flow-directing valves 48 and 74.

In view of the above preliminary structural description of the machine depicted in FIG. 2, a complete understanding thereof may now best be accomplished by assuming a particular state of operation and explaining the sequence which follows such a state to describe a complete cycle of operation while also describing some of the structure in greater detail. Accordingly, assume initially that the reciprocating actuator 50 is yielding downwardly with the rod 112 in a down stroke, currently in the position illustrated. Furthermore, assume that the three-way ball valves 34 and 72 are positioned with their passages in the solid-line state so that fluid is being forced from the fluid sources 10 and 12 in a flow toward the metering structures 48 and 74.

As the down stroke of the actuator 50 continues while the cylinders 52 and 82 are being filled, the rod 112 bottoms out and the feet 66 and 90 continue moving to ultimately engage the air switches 68 and 98 respectively indicating that the pistons 54 and 84 have reached the bottom of their strokes in the cylinders 52 and 82. With the actuation of the air switches 68 and 98, a duct is opened from an air source S through a line 144 to the directional control valve 100. Consequently, a control signal is provided which actuates the control valve 100 to supply the alternate signal in one of the lines 125 commanding the driver 102 to revolve the drive wheel 138 through one half turn. Note that the same lines 125 also control an acutator 145 to alternately position the valve 99 for control of the pigment.

When actuated, the gear wheels 140 and 134 are both revolved through one half revolution moving the ball valves 34 and 72 respectively to open the dashed-line passages as illustrated (closing the solid-line passages). With the completion of one half revolution by the gear wheel 134, the lobe 132 actuates the air switch 130 so that an air signal is supplied from a source S to the directional control valve 118. That air signal repositions the valve 118 (as by shifting a spool) altering the pneumatic signals in the lines 114 and 116 with the result that the actuator is reversed to initiate an upward stroke of the rod 112.

As indicated above, in completing a half revolution, the gear wheels 134 and 140 revolved the ball valves 34 and 72 to open the dashed-line paths connecting the metering structures 48 and 74 to the ducts 38 and 78 respectively. Fluid flow through such ducts is initiated as the actuator 50 forcefully operates through the drive plate 58 and the rods 56 and 86 moving the pistons through an upward stroke and discharging fluid from the cylinders 52 and 82. The resulting flow is through the check valves 42 and 80 respectively into the mixing chamber 44 with the result that a composite fluid mixture is provided from the nozzle 14.

In the upward motion of the plate 58, a metered quantity of the mixture is provided from the nozzle 14, until the rod 110 eventually contacts the air switch 108 opening the switch to provide a passage from an air source S to the directional control valve 100. Upon such an occurrence, the valve 100 is actuated to motivate the half revolution driver 102 which in turn turns the drive wheel 108 through a half revolution reversing the positions of the ball valves 34 and 72 respectively and bringing the lobe 132 into contact with the air switch 128. As a consequence, a pneumatic or air signal is supplied through the air switch 128 to actuate the directional control valve 118 which in turn reverses the stroke direction of the actuator 50 initiating a stroke as was assumed to be in progress at the beginning of the explanation.

It is to be noted that the streams of fluids A and B into the mixing chamber 44 (static or dynamic) are at a rate which coincides with the desired volumetric relationship of the mixture. The pigment is similarly supplied in a uniform, though somewhat less critical flow. In that regard, the cylinders 52 and 82 (along with mating pistons 54 and 84) may be readily changed to accomplish different predetermined ratios of mixture. However, in view of the linearly related motion of the rods 56 and 86, the streams will be preserved in the desired ratio. It is also to be noted that as a result of the positive action of the ball valves 34 and 72, in combination with the control system, the streams are initiated and terminated together with the result that the desired ratio is not subject to substantial deviation as a result of time offsets in valving operations.

As indicated above, it may be desirable to vary the volume of the discharge during the cycle of operation. To accomplish such variations, the rod 110 is simply adjusted to determine the stroke length of the actuator 50 and accordingly the pistons 54 and 84. At the position where the rod 110 actuates the air switch 108, the up stroke is terminated. Accordingly, the volume for each discrete discharge can be effectively controlled.

Of course, other modifications to the system will be readily apparent to one of ordinary skill in the art, as will modifications to provide equivalent operations as the utilization of electrical apparatus for control purposes in lieu of pneumatic. Thus, it will be appreciated that the scope hereof shall not be referenced to the disclosed embodiments, but on the contrary shall be determined in accordance with the claims as set forth below.

What is claimed is:

1. A machine for metering fluids in a precise mixture to an outlet chamber from a plurality of pressurized sources, comprising:

a plurality of cylinder structures coinciding in number to said plurality of pressurized sources, each of said cylinder structures including piston means for varying the operating volume of said cylinder structures to receive and discharge said fluids;

a plurality of positive control two-state valve means coinciding in number to said cylinder structures, said valve means being connected to control the flow of fluids into said cylinder structures from said pressurized sources and out of said cylinder structures to said outlet chamber;

independent switch means for each of said piston means for sensing the positions of said piston means whereby to indicate that each of said piston means has attained a predetermined bottom position in one of said cylinder means;

actuator mens loosely coupled to linearly drive said piston means for moving said piston means from said predetermined bottom positions to meter fluids therefrom; and control means for said actuator means and said positive control valve means whereby upon said independent switch means indicating that said piston means have attained said bottom position, said control valves are set to provide passages from said cylinder means to said outlet chamber and said actuator drives said piston means to meter fluid from said cylinder means until said piston means attains a predetermined top position in said cylinder means, whereupon said actuator means is de-energized and the states of said valve means are changed to provide passages from said sources to said cylinder structures.

2. A machine according to claim 1 wherein said control means comprises a pneumatic system utilizing directional control valves.

3. A machine according to claim 1 wherein said control means further includes means for varying the stroke length of said actuator means to vary the discharge from said machine for each reciprocation of said metering structures.

4. A machine according to claim 1 wherein said positive valve means comprise rotary ball valves.

5. A machine according to claim 4 wherein said control means further includes: a pair of gear wheels connected to control said ball valves and a drive gear wheel means commonly meshed with said pair of gear wheels.

* * * * *

UNITED STATES PATENT AND TRADEMARK OFFICE
CERTIFICATE OF CORRECTION

PATENT NO. : 4,228,924

DATED : October 21, 1980

INVENTOR(S) : Charles H. Gilbert

It is certified that error appears in the above—identified patent and that said Letters Patent are hereby corrected as shown below:

Column 3, line 34, "fromthe" should be --from the--; and

Column 6, line 38, "the cycle" should be --a cycle--.

Signed and Sealed this

Third Day of February 1981

[SEAL]

Attest:

RENE D. TEGTMEYER

Attesting Officer     Acting Commissioner of Patents and Trademarks